United States Patent
Schröder genannt Berghegger et al.

(10) Patent No.: US 11,725,968 B2
(45) Date of Patent: Aug. 15, 2023

(54) MEASUREMENT OF ABSOLUTE TIME OF FLIGHT IN AN ULTRASONIC METER USING RECEIVED AND REFLECTED WAVES

(71) Applicant: Honeywell International Inc., Morris Plains, NJ (US)

(72) Inventors: Ralf Heinrich Schröder genannt Berghegger, Glandorf (DE); Andreas Wuchrer, Georgsmarienhütte (DE); Tobias Meimberg, Osnabrück (DE); Christian Lampe-Jürgens, Spelle (DE); Norbert Flerage, Löningen (DE)

(73) Assignee: Honeywell International Inc., Charlotte, NC (US)

( * ) Notice: Subject to any disclaimer, the term of this patent is extended or adjusted under 35 U.S.C. 154(b) by 204 days.

(21) Appl. No.: 17/215,160

(22) Filed: Mar. 29, 2021

(65) Prior Publication Data
US 2021/0381864 A1     Dec. 9, 2021

Related U.S. Application Data

(60) Provisional application No. 63/036,185, filed on Jun. 8, 2020.

(51) Int. Cl.
*G01F 1/66* (2022.01)
*G01F 1/667* (2022.01)

(52) U.S. Cl.
CPC ............. *G01F 1/662* (2013.01); *G01F 1/667* (2013.01)

(58) Field of Classification Search
None
See application file for complete search history.

(56) References Cited

U.S. PATENT DOCUMENTS

| | | | | |
|---|---|---|---|---|
| 6,062,091 | A * | 5/2000 | Baumoel | G01F 1/667 73/861.27 |
| 8,813,575 | B2 | 8/2014 | Peczalski et al. | |
| 9,410,833 | B1 * | 8/2016 | Leaders | G01F 1/661 |

(Continued)

FOREIGN PATENT DOCUMENTS

| | | |
|---|---|---|
| CN | 110168319 A | 8/2019 |
| CN | 111157065 A | 5/2020 |

(Continued)

OTHER PUBLICATIONS

TI Designs: TIDM-02003, "Ultrasonic sensing subsystem reference design for gas flow measurement", TIDUEJ6-Jan. 2019.

(Continued)

*Primary Examiner* — Harshad R Patel
(74) *Attorney, Agent, or Firm* — Ortiz & Lopez, PLLC; Kermit D. Lopez; Luis M. Ortiz

(57) ABSTRACT

A method and system for measuring a time of flight can involve correlating a signal comprising a reflected signal from a first transducer to a second transducer, or a subsequent reflected signal at the first transducer or the second transducer, with a previously received signal to produce a correlation for a measurement of a time of flight. The signal(s) can include one or more of a pulse train, acoustic sound; ultrasonic sound; or light, and the previously received signal can be a signal that has been reflected one or more times.

17 Claims, 3 Drawing Sheets

(56) References Cited

U.S. PATENT DOCUMENTS

| | | | |
|---|---|---|---|
| 2015/0355001 A1* | 12/2015 | Dabak | G06F 17/15 |
| | | | 702/48 |
| 2018/0010941 A1* | 1/2018 | Baumoel | G01F 1/667 |
| 2019/0118224 A1 | 4/2019 | Kastelein | |
| 2020/0072680 A1* | 3/2020 | Phan Le | G01K 11/24 |
| 2020/0133313 A1 | 4/2020 | Sipka et al. | |
| 2020/0182667 A1* | 6/2020 | Mayle | G01F 1/662 |
| 2021/0003436 A1 | 1/2021 | Huang et al. | |
| 2021/0381863 A1* | 12/2021 | Meimberg | G01F 1/666 |

FOREIGN PATENT DOCUMENTS

| | | |
|---|---|---|
| DE | 102008026620 A1 | 12/2009 |
| GB | 2275108 A | 8/1994 |

OTHER PUBLICATIONS

European search Report for corresponding EP Application No. 21177261.1, dated Feb. 11, 2021.

\* cited by examiner

202

```
Correlate measurement of a received reflected signal
at the 1st transducer with the received signal at the
2nd transducer
                                                    204
```
↓
```
Process the same operation in the opposite direction
                                                    206
```
↓
```
Calculate the average of both measurements, wherein
the average is the AbsToF
                                                    208
```

```
Correlate the two times reflected wave at the 2nd
transducer with the direct wave at the 2nd transducer
                                                    210
```
↓
```
Result of this measurement divided by two is the
AbsTOF                                              212
```

FIG. 3

MEASUREMENT OF ABSOLUTE TIME OF FLIGHT IN AN ULTRASONIC METER USING RECEIVED AND REFLECTED WAVES

CROSS-REFERENCE TO PROVISIONAL APPLICATION

This patent application claims priority under 35 U.S.C. § 119(e) to U.S. Provisional Patent Application Ser. No. 63/036,185 entitled "Measurement of Absolute Time of Flight in an Ultrasonic Meter Using Received and Reflected Waves," which was filed on Jun. 8, 2020, the disclosure of which is incorporated herein by reference in its entirety.

TECHNICAL FIELD

Embodiments relate to ultrasonic flow meters and time of flight (ToF) measurements used in determining the flow of a fluid (e.g., a gas or a liquid). Embodiments further relate to techniques, devices and systems for measuring the absolute time of flight (AbsToF) of a flow of fluid in ultrasonic flow meter.

BACKGROUND

Many systems incorporate flow meters that can detect and measure the flow rate of a fluid in one or more system conduits. For example, many heating and air conditioning systems sense air flow for energy monitoring and/or may also sense natural gas flow. In addition, numerous and varied manufacturing processes can sense the flow rate of various fluids utilized in the process.

Many flow meters are invasive, which means the flow meters may rely on one or more elements that are physically disposed within the flow stream. Because of this, these meters or sensors can be potentially costly to install, maintain, and replace. As may be appreciated, these costs may be significantly reduced if the flow meter is non-invasive, meaning it may be installed without having to shut down the system or temporarily stop the flow of fluid. There are also invasive ultrasonic meters, which may be especially implemented for small pipes or conduits, and can be configured with a size smaller than that of mechanical meters. Most invasive ultrasonic meters have no moving parts and therefore typically do not cause audible noise.

A common method of measuring the flow rate with an ultrasonic meter involves measuring the absolute time of flight downstream and upstream and the delta time of flight (i.e., the Delta time of flight is the difference between the absolute time of flight downstream and upstream). The flow rate Q can be calculated using the following formula:

$$Q = \frac{LA}{2} \frac{\Delta T}{T_{12} T_{21}} \quad (1)$$

where:

$T_{12}$—Absolute Time of Flight from Transducer 1 to Transducer 2

$T_{21}$—Absolute Time of Flight from Transducer 2 to Transducer 1

$\Delta T$—Delta Time of Flight between Upstream and Downstream

L—Length between Transducer 1 and Transducer 2

A—Cross section of the channel

An ultrasonic flow meter (also referred to simply as an ultrasonic meter) can measure the flow rate of a fluid (e.g., a gas or a liquid) based on the absolute time of flight (AbsToF). That is, the absolute time of flight is needed to calculate the flow rate of a fluid flowing through a flow channel or fluid channel associated with the ultrasonic meter.

Error in the absolute time of flight measurement, however, increases the total error of the flow rate measurement. There are different ways to measure time of flight in an ultrasonic meter. One technique (which is probably the most precise approach) uses a correlation of the received signal with the excitation.

There are two problems, however, with this approach. First, there may be a delay between the excitation that is known to the electronics and the actual signal that is sent by the transducer. This delay can include variations (e.g., due to tolerances, temperature aging, etc). These variations can cause errors in the measurement. Second, the excitation signal can posses a different shape than the received signal. Therefore, the correlation may not be precise, especially when only few samples are used for correlation due to timing and energy constraints.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the disclosed embodiments to provide for improved methods and systems for measuring the absolute time of flight in an ultrasonic meter.

It is another aspect of the disclosed embodiments to provide for methods and systems for measuring the absolute time of flight which results in a reduction in the total error of the flow measurement, thereby enabling or fluid meters to perform with lower measurement tolerances.

It is a further aspect of the disclosed embodiments to provide the improvement of the performance of an ultrasonic meter, such as an ultrasonic gas meter.

The aforementioned aspects and other objectives can now be achieved as described herein.

In an embodiment, a method of measuring the time of flight (ToF) can involve correlating a signal comprising a reflected signal from a first transducer to a second transducer, or a subsequent reflected signal at the first transducer or the second transducer, with a previously received signal to produce a correlation for a measurement of a time of flight.

In an embodiment of the method, the signal(s) can comprise one or more of: a pulse train, acoustic sound; ultrasonic sound; or light.

In an embodiment of the method, the previously received signal can comprise a signal that has been reflected one or more times.

The embodiment of the method can further involve measuring the absolute time of flight based on the correlation, wherein the absolute time of flight is proportional to a distance between the first transducer and the second transducer divided by a speed of sound or a speed of light.

In an embodiment of the method, the absolute time of flight can be measured by the correlation of the reflected signal after even reflections with the received signal, wherein when the speed of the motion of a medium between the first transducer and the second transducer is slight in comparison to the speed of sound or the speed of light, a time measured with the correlation divided by the number of reflections comprises the absolute time of flight. Note that in this case $T_{21}*T_{12}$ in the formula of equation (2) can be approximated by (absolute time of flight)$\bigcirc^2$.

In an embodiment of the method, the absolute time of flight can be measured by the correlation of a reflected signal after odd reflections with the received signal, wherein when a signal is sent by the other transducer of the first transducer or the second transducer, a same measurement is accomplished in an opposite direction, and wherein both times measured with the correlation divided by the number of reflections comprise the absolute time of flight. Note that in this case $T_{21}$ can be the absolute time of flight in one direction, and T12 can be the AbsToF in the other direction.

In an embodiment of the method, the delta time of flight can be calculated as a difference between both measured times divided by the number of reflections.

In another embodiment, a system for measuring the time of flight can include a first transducer and a second transducer, wherein a signal comprising a reflected signal from the first transducer to the second transducer, or a subsequent reflected signal at the first transducer or the second transducer, can be correlated with a previously received signal to produce a correlation for a measurement of a time of flight.

In an embodiment of the system, the signal can comprise one or more of: a pulse train, acoustic sound; ultrasonic sound; or light.

In an embodiment of the system, the previously received signal comprises a signal that has been reflected one or more times.

In an embodiment of the system, the absolute time of flight can be measured based on the correlation, wherein the absolute time of flight is proportional to a distance between the first transducer and the second transducer divided by a speed of sound or a speed of light.

In an embodiment of the system, the absolute time of flight can be measured by the correlation of the reflected signal after even reflections with the received signal, wherein when the speed of the motion of a medium between the first transducer and the second transducer is slight in comparison to the speed of sound or the speed of light, a time measured with the correlation divided by the number of reflections comprises the absolute time of flight.

In an embodiment of the system, the absolute time of flight can be measured by the correlation of a reflected signal after odd reflections with the received signal, wherein when a signal is sent by the other transducer of the first transducer or the second transducer, a same measurement is accomplished in an opposite direction, and wherein an average of both times measured with the correlation divided by a number of reflections comprises the absolute time of flight.

In an embodiment of the system, the delta time of flight can be calculated as a difference between both measured times divided by the number of reflections.

In another embodiment, a system for measuring time of flight, can include: at least one processor; and a non-transitory computer-usable medium embodying computer program code, the computer-usable medium capable of communicating with the at least one processor, the computer program code comprising instructions executable by the at least one processor and configured for: correlating a signal comprising a reflected signal from a first transducer to a second transducer, or a subsequent reflected signal at the first transducer or the second transducer, with a previously received signal to produce a correlation for a measurement of a time of flight.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2 illustrates a flow chart of operations depicting logical operational steps of a method for measuring the AbsToF in an ultrasonic meter, in accordance with an embodiment;

FIG. 3 illustrates a flow chart of operations depicting logical operational steps of a method for measuring the AbsToF in an ultrasonic meter, in accordance with an alternative embodiment.

DETAILED DESCRIPTION

Figure 1:
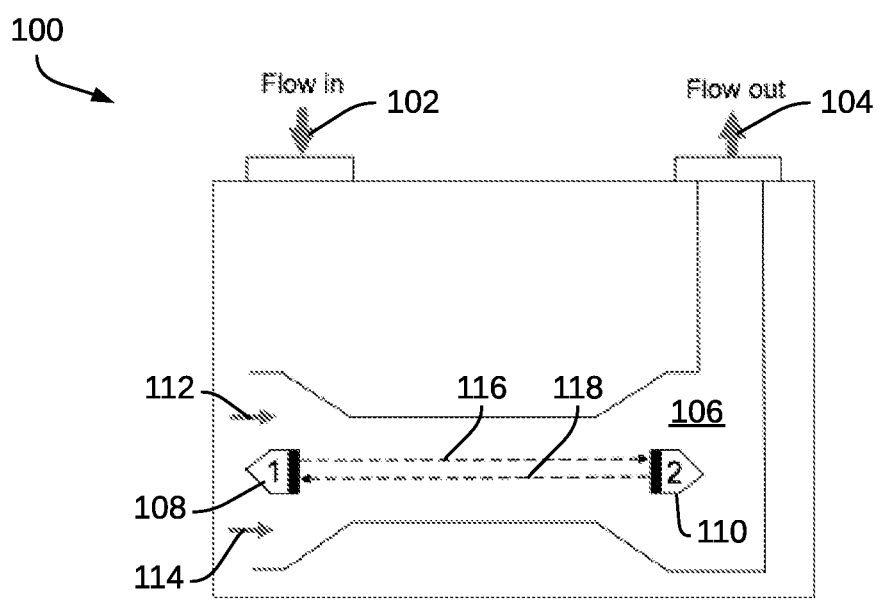
FIG. 1 illustrates a schematic diagram depicting an ultrasonic meter, which can be implemented in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The disclosed embodiments can be implemented in the context of an ultrasonic flow meter that can measure flow (e.g., fluid velocity) of a fluid via ultrasound, acoustic sound, or light. The ultrasonic flow meter can be implemented as an ultrasonic gas meter and/or can be attached externally to pipes. The fluid flow may be measured by time of flight of an ultrasonic signal through the fluid, or by measuring the ultrasonic Doppler effect, or by other ultrasound signal processing techniques. Fluid flow may be measured by multiplying fluid velocity by the interior area of a pipe (e.g., a flow channel).

FIG. 1 illustrates a schematic diagram depicting an ultrasonic flow meter 100, which can be implemented in accordance with an embodiment. The ultrasonic flow meter 100 can be implemented as a system that includes a flow channel 106 through which a fluid (e.g., a gas, liquid, etc) may flow. One or more transducers including, for example, a first transducer 108 and a second transducer 110, can be disposed within the ultrasonic flow meter 100. The in-flow direction of the fluid with respect to the ultrasonic flow meter 100 is indicated by arrow 102. The out-flow direction of the fluid with respect to the ultrasonic flow meter 100 is indicated by arrow 104. The flow of the fluid in the flow channel 106 is indicated by arrow 112 and arrow 114. The flow channel 106 may be implemented as a pipe, which in operation has a fluid therein, being a liquid or a gas, such as natural gas.

Dashed arrows 116 and 118 shown in FIG. 1 are generally indicative of signal paths between the first transducer 108 and the second transducer 108. In some embodiments, the first transducer 108 and the second transducer 108 can be implemented as piezoelectric transducer elements that can employ piezoelectric crystals or piezoelectric ceramics or MEMS ultrasonic transducers that can be set into vibration when a pulsed voltage signal (e.g., receipt from a transmitter) is applied, thereby generating ultrasonic waves. In operation, ultrasonic pulses can be alternately transmitted by one of the piezoelectric elements and can be received by the other piezoelectric element of the pair needed for a flow measurement.

Note that the term time of flight (ToF) as utilized herein can relate to the time-of-flight principle, which can involve measuring the speed of sound in a medium between two sensors (e.g., a transducer, piezoelectric element, etc), based on the time difference between the emission of a signal and its return to the sensor, after being reflected by the other sensor.

As will be discussed in greater detail below, a method for measuring the AbsToF in an ultrasonic meter can involve the use of reflected signals. The received reflected signal at the first transducer (reflected wave) can be correlated with the received signal at the second signal. Then, the same operation can be implemented in the opposite direction. The average of both measurements is the AbsToF. Alternatively, the two times reflected wave at the second transducer can be correlated with the direct wave at the second transducer. The result of this alternative measurement divided by two is the AbsToF.

Note that all the measurements can be performed with a single pulse train sent to the first transducer. Alternatively, subsequent measurements can be used to reduce hardware requirements (e.g., speed and size of storage).

FIG. 2 illustrates a flow chart of operations depicting logical operational steps of a method 202 for measuring the AbsToF in an ultrasonic meter such as ultrasonic meter 100 depicted in FIG. 1, in accordance with an embodiment. As depicted at block 204, a step, operation or instructions can be implemented for correlating the measurement of a received signal at the first transducer 108 with the received signal at the second transducer 110 discussed previously with respect to FIG. 1. Then, as shown at block 206, the same operation depicted at block 204 can be implemented or processed in the opposite direction. Next, as shown at block 208, a step, operation or instructions can be implemented for calculating the average of both measurements, wherein the average is the AbsToF. That is, the average of both measurements is the AbsToF.

FIG. 3 illustrates a flow chart of operations depicting logical operational steps of a method 220 for measuring the AbsToF in an ultrasonic meter such as the ultrasonic meter depicted in FIG. 1, in accordance with an alternative embodiment. As shown at block 210, a step or operation can be implemented for correlating the two times reflected wave at the second transducer 110 with the direct wave at the second transducer 110. The results of this measurement divided by two is the AbsToF as shown at block 212. Following implementation of these operations, subsequent measurements can be implemented for reducing hardware requirements (e.g., speed and size of range).

The operations depicted in FIG. 2 and FIG. 3 relate to a new method for measuring the AbsToF. This approach can use reflected signals and can be summarized as follows:

1. The received reflected signal at the first transducer 108 (reflected wave) is correlated with the received signal at the second transducer 110.
2. Then the same is done in the opposite direction. The average of both measurements is the AbsToF.
3. Alternatively the two times reflected wave at the second transducer 110 can be correlated with the direct wave at the second transducer 110.
4. The result of this measurement divided by two is the AbsToF.
5. All the measurements can be done with a single pulse train sent to the first transducer 108.
6. Alternatively, subsequent measurements can be used to reduce hardware requirements (speed and size of storage).

The disclosed embodiments thus can measure the time of flight using a correlation between the received signal and the received signal of a reflection (i.e., a correlation between received signal and 1st, 2nd, 3rd . . . nth reflection or between any reflections may also be possible.) This can eliminate the delay discussed previously because only received signals may be used. Additionally, the waveform of the received signal can be similar to the reflected signal, which can also improves the correlation. Therefore, the total error of the flow measurement can be reduced, which can enable gas or fluid meters such as the ultrasonic meter shown in FIG. 1 to operate with a lower measurement tolerance and hence can improve the performance of such ultrasonic meters.

Figure 4:
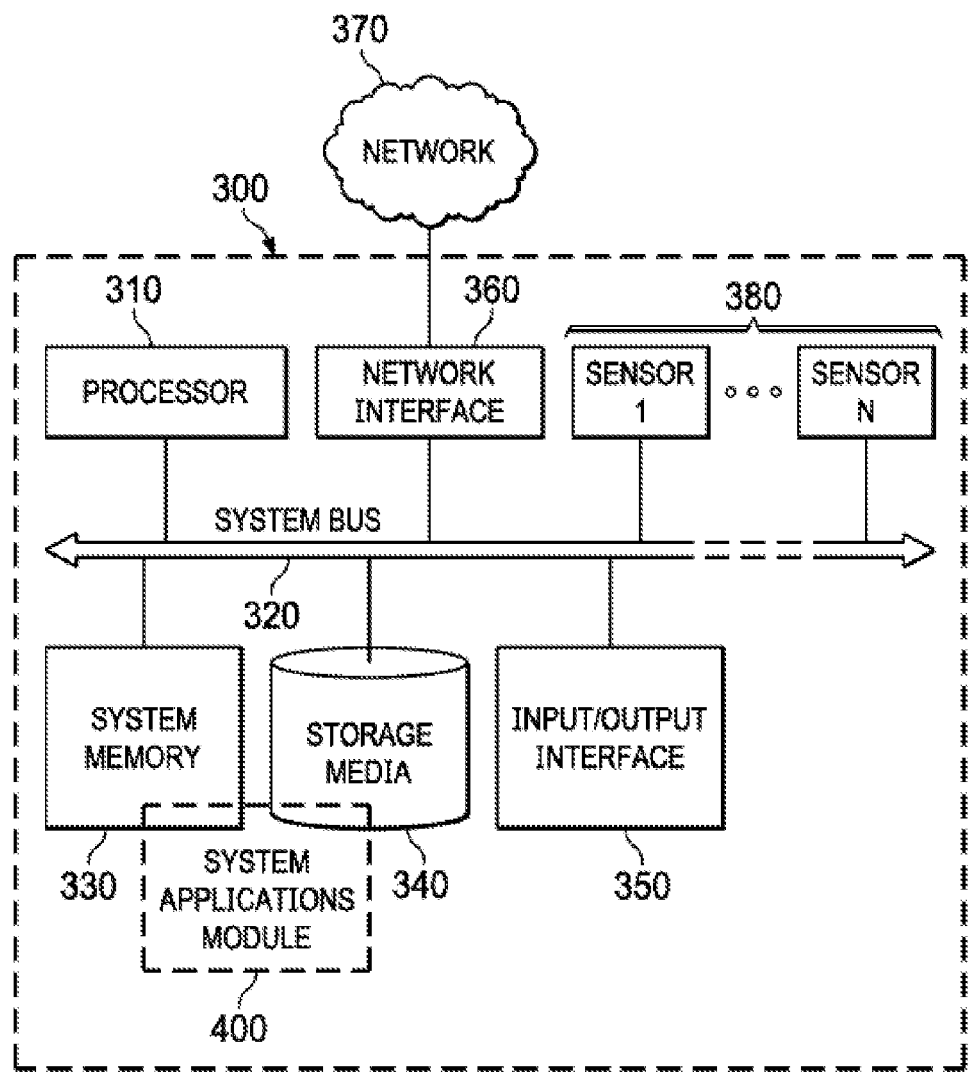
FIG. 4 illustrates a block diagram depicting a computing machine and system applications, according to certain example embodiments.

FIG. 4 illustrates a block diagram depicting a computing machine 300 and system applications, according to certain example embodiments. FIG. 4 illustrates the computing machine 300 and a system applications module 400. The computing machine 300 can correspond to any of the various computers, mobile devices, laptop computers, servers, embedded systems, or computing systems presented herein. The module 400 can comprise one or more hardware or software elements, e.g. other OS application and user and kernel space applications, designed to facilitate the computing machine 300 in performing the various methods and processing functions presented herein.

The computing machine 300 can include various internal or attached components such as a processor 310, system bus 320, system memory 330, storage media 340, input/output interface 350, a network interface 360 for communicating with a network 370, e.g. local loop, cellular/GPS, Bluetooth, or WIFI, and a series of sensors 380, e.g. any of the sensors such as the first transducer 108, the second transducer 110, and so on, identified in relation to FIG. 1. Note that in some embodiments, each sensor among the series of sensors 380 such as sensor 1, sensor n, etc. as shown in FIG. 4 may be representative of an ultrasonic meter such as the ultrasonic meter 100 shown in FIG. 1. That is, the computing system 300 may communicate with and/or control one or more ultrasonic meters or a group of ultrasonic meters, depending upon the metering implementation.

The computing machines can be implemented as a computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

The processor 310 can be designed to execute code instructions in order to perform the operations and functionality described herein, manage request flow and address mappings, and to perform calculations and generate commands. The processor 310 can be configured to monitor and control the operation of the components in the computing machines and to process instructions such as the various steps and operations described and shown herein with respect to FIGS. 1-4. The processor 310 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 310 can be a single processing unit, multiple processing units, a single processing core, multiple processing cores, special purpose processing cores, co-processors, or any combination thereof. According to certain embodiments, the processor 310 along with other components of the computing machine 300 can be a software based or hardware based virtualized computing machine executing within one or more other computing machines.

The system memory 330 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 330 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 330. The system memory 330 can be implemented using a single memory module or multiple memory modules. While the system memory 330 is depicted as being part of the computing machine, one skilled in the art will recognize that the system memory 330 can be separate from the computing machine 300 without departing from the scope of the subject technology. It should also be appreciated that the system memory 330 can include, or operate in conjunction with, a non-volatile storage device such as the storage media 340.

The storage media 340 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 340 can store one or more operating systems, application programs and program modules, data, or any other information. The storage media 340 can be part of, or connected to, the computing machine. The storage media 340 can also be part of one or more other computing machines that are in communication with the computing machine such as servers, database servers, cloud storage, network attached storage, and so forth.

The applications module 400 and other OS application modules can comprise one or more hardware or software elements configured to facilitate the computing machine with performing the various methods and processing functions presented herein. The applications module 400 and other OS application modules can include one or more algorithms or sequences of instructions stored as software or firmware in association with the system memory 330, the storage media 340 or both. The storage media 340 can therefore represent examples of machine or computer readable media on which instructions or code can be stored for execution by the processor 310. Machine or computer readable media can generally refer to any medium or media used to provide instructions to the processor 310.

Such machine or computer readable media associated with the applications module 400 and other OS application modules can comprise a computer software product. It should be appreciated that a computer software product comprising the applications module 400 and other OS application modules can also be associated with one or more processes or methods for delivering the applications module 400 and other OS application modules to the computing machine via a network, any signal-bearing medium, or any other communication or delivery technology. The applications module 400 and other OS application modules can also comprise hardware circuits or information for configuring hardware circuits such as microcode or configuration information for an FPGA or other PLD. In one exemplary embodiment, applications module 400 and other OS application modules can include algorithms capable of performing the functional operations described by the flow charts and computer systems presented herein.

The input/output ("I/O") interface 350 can be configured to couple to one or more external devices, to receive data from the one or more external devices, and to send data to the one or more external devices. Such external devices along with the various internal devices can also be known as peripheral devices. The I/O interface 350 can include both electrical and physical connections for coupling the various peripheral devices to the computing machine or the processor 310. The I/O interface 350 can be configured to communicate data, addresses, and control signals between the peripheral devices, the computing machine, or the processor 310.

The I/O interface 350 can be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 350 can be configured to implement only one interface or bus technology. Alternatively, the I/O interface 350 can be configured to implement multiple interfaces or bus technologies. The I/O interface 350 can be configured as part of, all of, or to operate in conjunction with, the system bus 320. The I/O interface 350 can include one or more buffers for buffering transmissions between one or more external devices, internal devices, the computing machine, or the processor 320.

The I/O interface 320 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 320 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 300 can operate in a networked environment using logical connections through the NIC 360 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 310 can be connected to the other elements of the computing machine or the various peripherals discussed herein through the system bus 320. It should be appreciated that the system bus 320 can be within the processor 310, outside the processor 310, or both. According to some embodiments, any of the processors 310, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application.

As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

The techniques described herein can be applied to various types of flow measurement device and systems such as ultrasonic flow meters including but not limited to ultrasonic gas meters. In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the steps and operations for the methods described herein may be implemented using software instructions stored on a computer useable storage medium for execution by a computer. As an example, an embodiment of a computer program product can include a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), Flash memory, and so on.

Alternatively, embodiments may be implemented entirely in hardware or in an implementation containing both hardware and software elements. In embodiments that do utilize software, the software may include but is not limited to firmware, resident software, microcode, etc. Embodiments can be implemented, for example, at the stack level including a sensor, which may be a hardware device with some embedded software measuring/detecting & transmitting data (e.g. temperature, pressure, motion). Embodiments may also be implemented as embedded software that runs in a device/unit (e.g., firmware). Embodiments may also be implemented at the IOT (Internet of Things) stack level. For example, embodiments may be implemented in the context of a hardware device with some embedded software for measuring/detecting & transmitting data (e.g. temperature, pressure, motion, etc.). Measured data, for example, such as flow data, can be stored in, for example, the ultrasonic flow meter 100 discussed previously and sent to a server over a data communications network.

Embodiments may also be implemented in the context of a microcontroller such as (but not limited to) an MSP430FR5043 microcontroller. It should be appreciated by those skilled in the art that this reference to the MSP430FR5043 microcontroller is for illustrative and exemplary purposes only and is not considered a limiting feature of the embodiments. Other types of microcontrollers may be implemented in accordance with the embodiments. In general, the utilized microcontroller can be optimized for flow measurement using correlation. Furthermore, the same circuit diagram as for correlation with an excitation signal can be used with the embodiments, and only firmware changes may be required.

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method of measuring time of flight, comprising:
   correlating a signal comprising a reflected signal from a first transducer to a second transducer, or a subsequent reflected signal at the first transducer or the second transducer, with a previously received signal to produce a correlation for a measurement of a time of flight; and
   measuring an absolute time of flight based on the correlation, wherein the absolute time of flight is proportional to a distance between the first transducer and the second transducer divided by a speed of sound or a speed of light.

2. The method of claim 1 wherein the signal comprises at least one of: a pulse train, acoustic sound; ultrasonic sound; or light.

3. The method of claim 1 wherein the previously received signal comprises a signal that has been reflected one or more times.

4. The method of claim 1 wherein the absolute time of flight is measured by the correlation of the reflected signal after even reflections with the received signal, wherein when the speed of the motion of a medium between the first transducer and the second transducer is slight in comparison to the speed of sound or the speed of light, a time measured with the correlation divided by the number of reflections comprises the absolute time of flight.

5. The method of claim 1 wherein the absolute time of flight is measured by the correlation of a reflected signal after odd reflections with the received signal, wherein when a signal is sent by the other transducer of the first transducer or the second transducer, a same measurement is accomplished in an opposite direction, and wherein an average of both times measured with the correlation divided by a number of reflections comprises the absolute time of flight.

6. The method of claim 5 wherein a delta time of flight is calculated as a difference between both measured times divided by the number of reflections.

7. A system for measuring time of flight, comprising:
a first transducer; and
a second transducer, wherein a signal comprising a reflected signal from the first transducer to the second transducer, or a subsequent reflected signal at the first transducer or the second transducer, is correlated with a previously received signal to produce a correlation for a measurement of an absolute time of flight, wherein the measurement of the absolute time of flight is based on the correlation, and wherein the absolute time of flight is proportional to a distance between the first transducer and the second transducer divided by a speed of sound or a speed of light.

8. The system of claim 7 wherein the signal comprises at least one of: a pulse train, acoustic sound; ultrasonic sound; or light.

9. The system of claim 7 wherein the previously received signal comprises a signal that has been reflected one or more times.

10. The system of claim 7 wherein the absolute time of flight is measured by the correlation of the reflected signal after even reflections with the received signal, wherein when the speed of the motion of a medium between the first transducer and the second transducer is slight in comparison to the speed of sound or the speed of light, a time measured with the correlation divided by the number of reflections comprises the absolute time of flight.

11. The system of claim 7 wherein the absolute time of flight is measured by the correlation of a reflected signal after odd reflections with the received signal, wherein when a signal is sent by the other transducer of the first transducer or the second transducer, a same measurement is accomplished in an opposite direction, and wherein an average of both times measured with the correlation divided by a number of reflections comprises the absolute time of flight.

12. The system of claim 11 wherein a delta time of flight is calculated as a difference between both measured times divided by the number of reflections.

13. A system for measuring time of flight, comprising:
at least one processor; and
a non-transitory computer-usable medium embodying computer program code, the computer-usable medium capable of communicating with the at least one processor, the computer program code comprising instructions executable by the at least one processor and configured for:
correlating a signal comprising a reflected signal from a first transducer to a second transducer, or a subsequent reflected signal at the first transducer or the second transducer, with a previously received signal to produce a correlation for a measurement of a time of flight; and
measuring an absolute time of flight based on the correlation, wherein the absolute time of flight is proportional to a distance between the first transducer and the second transducer divided by a speed of sound or a speed of light.

14. The system of claim 13 wherein the signal comprises at least one of: a pulse, train, acoustic sound; ultrasonic sound; or light.

15. The system of claim 13 wherein the absolute time of flight is measured by the correlation of the reflected signal after even reflections with the received signal, wherein when the speed of the motion of a medium between the first transducer and the second transducer is slight in comparison to the speed of sound or the speed of light, a time measured with the correlation divided by the number of reflections comprises the absolute time of flight.

16. The system of claim 13 wherein the absolute time of flight is measured by the correlation of a reflected signal after odd reflections with the received signal, wherein when a signal is sent by the other transducer of the first transducer or the second transducer, a same measurement is accomplished in an opposite direction, and wherein an average of both times measured with the correlation divided by a number of reflections comprises the absolute time of flight.

17. The system of claim 16 wherein a delta time of flight is calculated as a difference between both measured times divided by the number of reflections.

* * * * *